United States Patent Office 3,141,455
Patented July 21, 1964

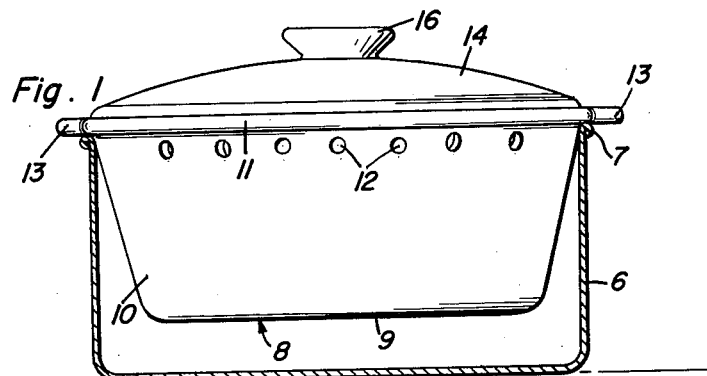
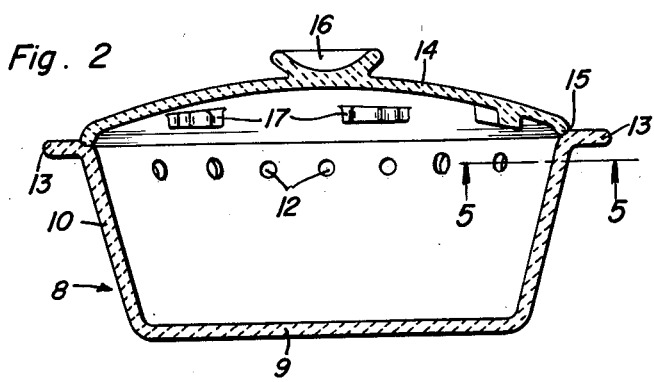
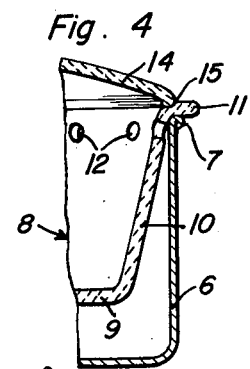
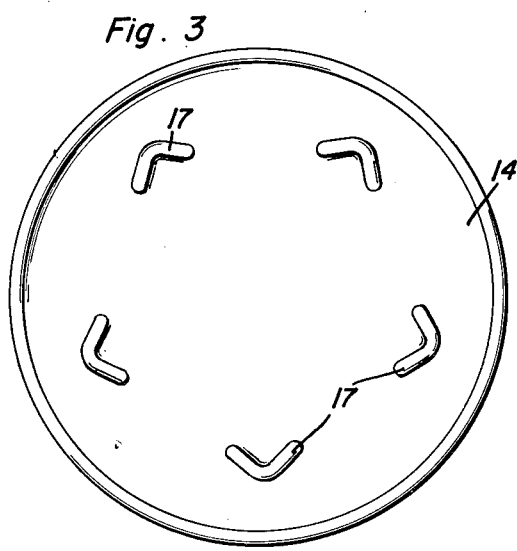
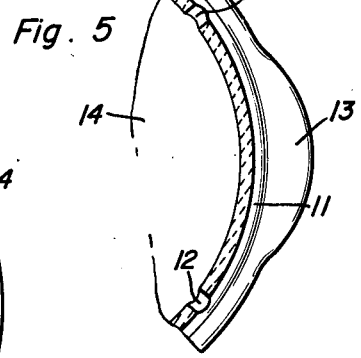
Helen E. Dumbeck
INVENTOR.

3,141,455
STEAM COOKING UTENSIL
Helen E. Dumbeck, 1233½ W. 8th Ave., Eugene, Oreg.
Filed Jan. 10, 1962, Ser. No. 165,374
2 Claims. (Cl. 126—369)

This invention relates to new and useful improvements in steam cookers and has for one of its important objects to provide, in a manner as hereinafter set forth, a utensil of this character comprising novel means for uniformly distributing the steam and condensed moisture over and into the food being cooked, thus ensuring a highly satisfactory result.

Another important object of the present invention is to provide a utensil of the aforementioned character wherein the food container is adapted to be safely used as a casserole and/or serving dish.

A further object of the invention is to provide an improved steam cooking utensil which is adapted for either home or institutional use.

Other objects of the invention are to provide a steam cooking utensil which is comparatively simple in construction, strong and durable, compact, of light weight, sanitary, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in vertical section of the utensil, showing the food container or receptacle in elevation;

FIGURE 2 is a vertical sectional view through the food container or receptacle;

FIGURE 3 is a bottom plan view of the cover;

FIGURE 4 is a fragmentary view in vertical section through a side portion of the device; and FIGURE 5 is a fragmentary view in horizontal section, taken substantially on the line 5—5 of FIGURE 2.

Referring now to the drawing in detail, it will be seen that the embodiment of the invention which has been illustrated comprises a pot 6 for the reception of water. The pot 6 may be of any suitable material. Also, the pot 6 may be of any desired capacity. In the embodiment shown, the pot 6 is cylindrical and comprises a rolled top bead 7.

Removably mounted in the pot 6 and resting on the top 7 thereof is a food receptacle or container 8 which may also be of any desired material. The container 8 includes a flat bottom 9 and a tapered peripheral wall 10. The container or receptacle 8 further includes an integral top flange 11 which is adapted to seat on the bead 7 of the pot 6 for removably suspending said receptacle therein.

As shown to advantage in FIGURES 2 and 4 of the drawing, the diametrically opposite side portions of the food receptacle 8 are provided, adjacent to but spaced below the flange 11, with series of upwardly directed circular steam openings 12, this upward direction being best seen in FIGURE 4. At points intermediate the series of steam openings 12 and well spaced therefrom the top of the food receptacle 8 is further provided with diametrically opposite, outwardly projecting integral handles 13. It is to be noted that there are no steam openings 12 in the vicinity of the handles 13.

Removably mounted on the food receptacle 8 and preferably of the same or other suitable low cost material such as, for example, Pyrex glass or aluminum, is a shallow, substantially dome-shaped cover 14. The periphery of the cover 14 is adapted to seat on the top portion of the receptacle 8, as at 15. Formed integrally with the cover 14 is a centrally located handle 16. Formed integrally with the underside of the cover 14 is a plurality of concentric, inwardly divergent generally V-shaped steam baffles 17.

It is thought that the use of the utensil will be readily apparent from a consideration of the foregoing. Briefly, the pot 6 is filled to the desired level with water and the receptacle 8, with the food therein and the cover 14 thereon, is mounted in said pot. As steam is generated in the pot 6 said steam flows through the openings 12 into the receptacle 8 and over and into the food therein. The baffles 17 assist in condensing the incoming steam and, additionally, distribute the steam and moisture uniformly over and into the food in the receptacle. When the food has been cooked the receptacle 8, through the medium of handle 13, may be readily lifted out of the pot 6 and carried to a dining or steam-holding table in the manner of a casserole. With the handles 13 remote from the nearest openings 12, there is no danger of scalding the hands. The utensil may be made in various sizes for both home and institutional use. Also, the device may be of any desired color. It will be observed that the baffles 17 are rounded and otherwise shaped to facilitate cleaning. As shown to advantage in FIGURE 3 of the drawing, the baffles 17 are spaced concentrically from the periphery of the cover 14 and the end portions of said baffles are inwardly divergent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A steam cooking utensil comprising a pot for the reception of water, a food receptacle removably mounted in said pot and comprising a top flange resting thereon, said receptacle having in diametrically opposite portions circumferential series of upwardly directed steam inlet openings adjacent the flange, and a removable cover on the receptacle, said cover including on its underside a plurality of integral baffles for distributing incoming steam from the openings uniformly over food in the receptacle, said baffles being spaced concentrically from the periphery of the cover, said baffles further being generally V-shaped and comprising inwardly divergent end portions.

2. The utensil of claim 1 wherein said receptacle further includes circumferentially elongated, radial handles integral with the flange resting on a rim of said pot.

References Cited in the file of this patent

UNITED STATES PATENTS

| | | |
|---|---|---|
| 158,323 | Smith | Dec. 29, 1874 |
| 1,383,971 | Biette | July 5, 1921 |
| 1,968,950 | Maigret | Aug. 7, 1934 |
| 2,541,094 | Pesenti | Feb. 13, 1951 |

FOREIGN PATENTS

| | | |
|---|---|---|
| 14,125 | Germany | July 29, 1881 |